US010860871B2

(12) United States Patent
Zhu et al.

(10) Patent No.: US 10,860,871 B2
(45) Date of Patent: Dec. 8, 2020

(54) INTEGRATED SENSOR CALIBRATION IN NATURAL SCENES

(71) Applicant: BEIJING DIDI INFINITY TECHNOLOGY AND DEVELOPMENT CO., LTD., Beijing (CN)

(72) Inventors: Xiaoling Zhu, Beijing (CN); Teng Ma, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 123 days.

(21) Appl. No.: 16/220,114

(22) Filed: Dec. 14, 2018

(65) Prior Publication Data

US 2019/0392228 A1 Dec. 26, 2019

Related U.S. Application Data

(63) Continuation of application No. PCT/CN2018/092649, filed on Jun. 25, 2018.

(51) Int. Cl.
*G06K 9/00* (2006.01)
*G01S 19/14* (2010.01)
(Continued)

(52) U.S. Cl.
CPC ........ *G06K 9/00805* (2013.01); *G01S 17/931* (2020.01); *G01S 19/14* (2013.01); *G06T 7/73* (2017.01); *G06T 2207/10028* (2013.01)

(58) Field of Classification Search
CPC ............ G06K 9/00805; G06T 7/73; G06T 2207/10028; G01S 17/931; G01S 19/14
See application file for complete search history.

(56) References Cited

U.S. PATENT DOCUMENTS 10,269,141 B1 * 4/2019 Shotan .................. G01S 17/86
2012/0290169 A1 11/2012 Zeng et al.
(Continued)

FOREIGN PATENT DOCUMENTS

| CN | 105598965 A | 5/2016 |
| CN | 105866762 A | 8/2016 |

(Continued)

OTHER PUBLICATIONS

International Search Report in PCT/CN2018/092649 dated Mar. 25, 2019, 5 pages.
(Continued)

*Primary Examiner* — Leon Flores
(74) *Attorney, Agent, or Firm* — Bayes PLLC

(57) ABSTRACT

Embodiments of the disclosure provide methods and systems for calibrating a plurality of sensors. The method may include capturing, by a plurality of sensors associated with a vehicle, a set of point cloud data indicative of at least one surrounding object as the vehicle travels along a trajectory. The method may also include filtering, by a processor, the set of point cloud data based on coplanarity associated with the set of point cloud data. The method may further include adjusting, by the processor, at least one calibration parameter of the plurality of sensors based on a model using the filtered set of point cloud data. The model may include a weight corresponding to the coplanarity associated with the set of point cloud data.

20 Claims, 7 Drawing Sheets

(51) Int. Cl.
*G06T 7/73* (2017.01)
*G01S 17/931* (2020.01)

(56) References Cited

U.S. PATENT DOCUMENTS

| | | | |
|---|---|---|---|
| 2015/0253352 | A1 | 9/2015 | Bechtler et al. |
| 2015/0317781 | A1 | 11/2015 | Napier et al. |
| 2016/0223652 | A1* | 8/2016 | Bosse .................. G01S 7/4808 |
| 2016/0249039 | A1 | 8/2016 | Tran et al. |
| 2017/0193312 | A1 | 7/2017 | Wang et al. |
| 2018/0113204 | A1 | 4/2018 | Chon |
| 2018/0157920 | A1 | 6/2018 | Hu |
| 2018/0188043 | A1* | 7/2018 | Chen ..................... G06T 7/70 |
| 2018/0348343 | A1* | 12/2018 | Achour .................. H01Q 3/44 |
| 2019/0384303 | A1* | 12/2019 | Muller .................. G06N 20/00 |

FOREIGN PATENT DOCUMENTS

| | | |
|---|---|---|
| CN | 107153186 A | 9/2017 |
| EP | 1091186 A3 | 12/2001 |
| WO | 2017196062 A1 | 11/2017 |
| WO | 2018064703 A1 | 4/2018 |
| WO | 2018195986 A1 | 11/2018 |

OTHER PUBLICATIONS

Written Opinion in PCT/CN2018/092649 dated Mar. 27, 2019, 4 pages.

Examination Report in Australian Application No. 2018282302 dated Oct. 25, 2019, 10 Pages.

He, Mengwen et al., Pairwise LIDAR Calibration Using Multi-Type 3D Geometric Features in Natural Scene, 2013 IEEE/RSJ International Conference on Intelligent Robots and Systems (IROS), 1828-1835, 2013.

He, Mengwen et al., Calibration Method for Multiple 2D LIDARs System, 2014 IEEE International Conference on Robotics and Automation (ICRA), 3034-3041, 2014.

Shang, Erke et al., An Efficient Calibration Approach for Arbitrary Equipped 3-D LiDAR Based on an Orthogonal Normal Vector Pair, Journal of Intelligent & Robotic Systems, 79(1): 21-36, 2015.

Rodriguez-Garavito, C. H. et al., Automatic Laser and Camera Extrinsic Calibration for Data Fusion using Road Plane, 17th International Conference on Information Fusion (FUSION), 3034-3041, 2014.

Office Action in Canadian Application No. 3027921 dated Apr. 8, 2020, 4 pages.

P.Rieger et al., Boresight Alignment Method for Mobile Laser Scanning Systems, Journal of Applied Geodesy, 4(1): 13-21, 2010.

Marcus Hebel et al., Simultaneous Calibration of ALS Systems and Alignment of Multiview LiDAR Scans of Urban Areas, IEEE Transactions on Geoscience and Remote Sensing, 50(6):2364-2379, 2012.

Extended European Search Report in European Application No. 18814479.4 dated May 13, 2020, 10 pages.

J Levinson et al., Unsupervised Calibration for Multi-beam Lasers, Springer Tracts in Advanced Robotics, 2014, 79: 179-193.

* cited by examiner

210

220

610 620

INTEGRATED SENSOR CALIBRATION IN NATURAL SCENES

CROSS-REFERENCE TO RELATED APPLICATIONS

This application is a continuation of International Application No. PCT/CN2018/092649, filed on Jun. 25, 2018, designating the United States of America, the contents of which are hereby incorporated by reference.

TECHNICAL FIELD

The present disclosure relates to methods and systems for sensor calibration, and more particularly to, methods and systems for calibration of Light Detection and Ranging (LiDAR) and navigation sensors.

BACKGROUND

Autonomous driving technology relies heavily on an accurate map. For example, accuracy of the navigation map is critical to functions of autonomous driving vehicles, such as positioning, ambience recognition, decision making and control. High-definition maps may be obtained by aggregating data acquired by various sensors and detectors on vehicles as they drive around. For example, a typical data acquisition system for high-definition maps is usually a vehicle equipped with multiple integrated sensors such as a LiDAR, a global positioning system (GPS) receiver, an inertial measurement unit (IMU) sensor, and even one or more cameras, to capture features of the road on which the vehicle is driving and the surrounding objects. Data captured may include, for example, center line or border line coordinates of a lane, coordinates and images of an object, such as a building, another vehicle, a landmark, a pedestrian, or a traffic sign.

The point cloud data obtained by the integrated sensors may be affected not only by the errors from the sensors themselves (e.g., laser ranging error, GPS positioning error, IMU attitude measurement error, etc.), but also by the integration errors from the integration of the LiDAR unit and the navigation unit (e.g., the GPS/IMU unit). The integration errors may include the mounting angle error due to the unparalleled coordinate axes of the LiDAR unit and the navigation unit, as well as the mounting vector error due to the offset between the center of the LiDAR and the GPS antenna. As a result, the calibration of the integrated LiDAR and navigation system becomes important for improving the accuracy of the point cloud data.

Existing integration sensor calibration methods use artificial calibration targets that are dedicated for sensor calibration. For example, a dedicated calibration facility needs to be built with artificial calibration targets arranged in a particular way to collect calibration data. Those methods have limited the calibration efficiency and flexibility due to the specific requirements on the design and arrangement of the calibration targets. Another calibration approach attempts to acquire calibration data from planar objects in the natural scenes, which quantifies the distance from each point to a nearby surface constructed from its surrounding points, and the calibration is then implemented by optimizing its value of this distance. However, a variety of moving objects (e.g., other vehicles) and static non-planar objects (e.g., plants) exist in the natural scenes, and their point cloud data, as non-coplanar data, can reduce the calibration accuracy, thereby limiting application of this calibration method based on the natural scenes.

Embodiments of the disclosure address the above problem by improved methods and systems for integrated sensor calibration in natural scenes.

SUMMARY

Embodiments of the disclosure provide a method for calibrating a plurality of sensors. The method may include capturing, by a plurality of sensors associated with a vehicle, a set of point cloud data indicative of at least one surrounding object as the vehicle travels along a trajectory. The method may also include filtering, by a processor, the set of point cloud data based on coplanarity associated with the set of point cloud data. The method may further include adjusting, by the processor, at least one calibration parameter of the plurality of sensors based on a model using the filtered set of point cloud data. The model may include a weight corresponding to the coplanarity associated with the set of point cloud data.

Embodiments of the disclosure also provide a system for calibrating a plurality of sensors. The system may include a plurality of sensors associated with a vehicle and configured to capture a set of point cloud data indicative of at least one surrounding object, as the vehicle travels along a trajectory. The system may also include a processor configured to filter the set of point cloud data based on coplanarity associated with the set of point cloud data. The processor may be further configured to adjust at least one calibration parameter of the plurality of sensors based on a model using the filtered set of point cloud data. The model includes a weight corresponding to the coplanarity associated with the set of point cloud data.

Embodiments of the disclosure further provide a non-transitory computer-readable medium having instructions stored thereon that, when executed by one or more processors, causes the one or more processors to perform operations. The operations may include receiving a set of point cloud data indicative of at least one surrounding object captured by a plurality of sensors associated with a vehicle, as the vehicle travels along a trajectory. The operations may also include filtering the set of point cloud data based on coplanarity associated with the set of point cloud data. The operations may further include adjusting at least one calibration parameter of the plurality of sensors based on a model using the filtered set of point cloud data. The model includes a weight corresponding to the coplanarity associated with the set of point cloud data.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
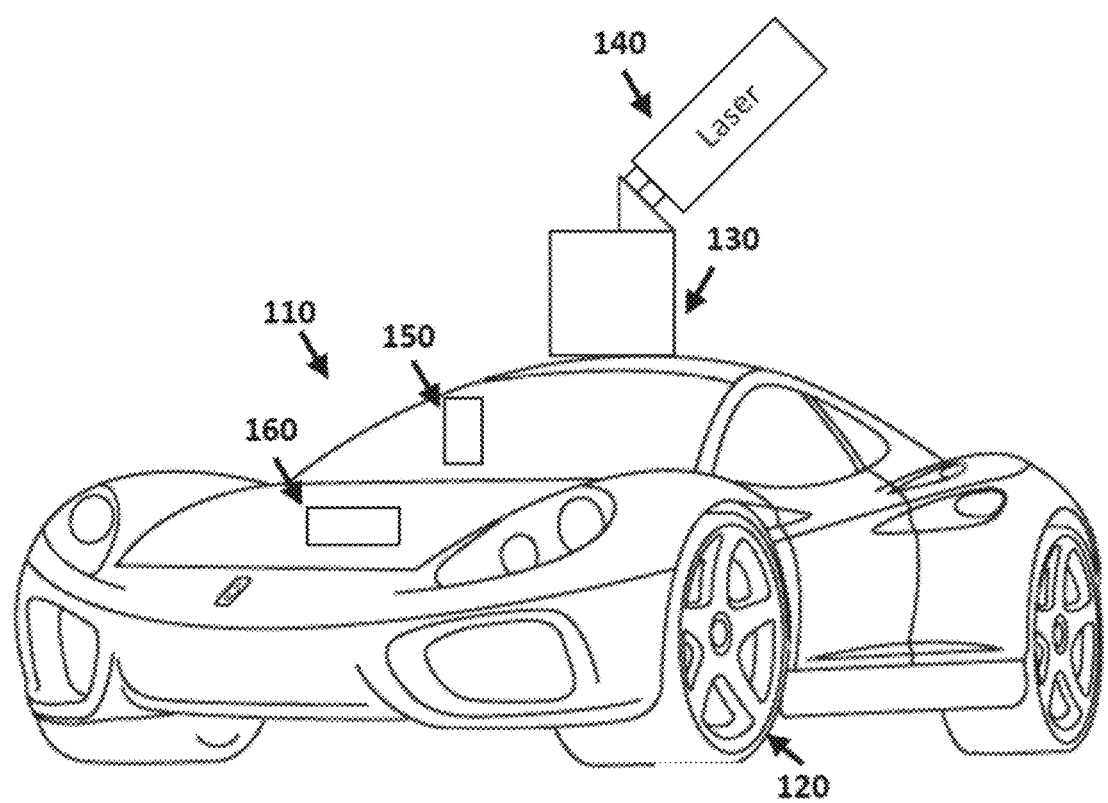
FIG. 1 illustrates a schematic diagram of an exemplary vehicle having sensors, according to embodiments of the disclosure.

FIG. 1 illustrates a schematic diagram of an exemplary vehicle 100 having a plurality of sensors 140 and 150, according to embodiments of the disclosure. Consistent with some embodiments, vehicle 100 may be a survey vehicle configured for acquiring data for constructing a high-definition map or three-dimensional (3-D) city modeling. It is contemplated that vehicle 100 may be an electric vehicle, a fuel cell vehicle, a hybrid vehicle, or a conventional internal combustion engine vehicle. Vehicle 100 may have a body 110 and at least one wheel 120. Body 110 may be any body style, such as a sports vehicle, a coupe, a sedan, a pick-up truck, a station wagon, a sports utility vehicle (SUV), a minivan, or a conversion van. In some embodiments, vehicle 100 may include a pair of front wheels and a pair of rear wheels, as illustrated in FIG. 1. However, it is contemplated that vehicle 100 may have less wheels or equivalent structures that enable vehicle 100 to move around. Vehicle 100 may be configured to be all wheel drive (AWD), front wheel drive (FWR), or rear wheel drive (RWD). In some embodiments, vehicle 100 may be configured to be operated by an operator occupying the vehicle, remotely controlled, and/or autonomous.

As illustrated in FIG. 1, vehicle 100 may be equipped with various sensors 140 and 150 mounted to body 110 via a mounting structure 130. Mounting structure 130 may be an electro-mechanical device installed or otherwise attached to body 110 of vehicle 100. In some embodiments, mounting structure 130 may use screws, adhesives, or another mounting mechanism.

Consistent with some embodiments, sensors 140 and 150 may be configured to capture data as vehicle 100 travels along a trajectory. For example, sensor 140 may be a LiDAR scanner configured to scan the surrounding and acquire point clouds. LiDAR measures distance to a target by illuminating the target with pulsed laser light and measuring the reflected pulses with a sensor. Differences in laser return times and wavelengths can then be used to make digital 3-D representations of the target. The light used for LiDAR scan may be ultraviolet, visible, or near infrared. Because a narrow laser beam can map physical features with very high resolution, a LiDAR scanner is particularly suitable for high-definition map surveys. In some embodiments, a LiDAR scanner may capture point cloud. As vehicle 100 travels along the trajectory, sensor 140 may continuously capture data. Each set of scene data captured at a certain time range is known as a data frame.

In some embodiments, sensor 140 may include a combination of LiDAR scanner and a 3-D camera configured to take digital images. As vehicle 100 travels along a trajectory, both digital images and point clouds are acquired. The point clouds acquired from the LiDAR scanner can be later matched with digital images taken of the scanned area from the scanner's location to create realistic looking 3-D models. For example, each point in the point cloud may be given the color of the pixel from the image taken located at the same angle as the laser beam that created the point.

As illustrated in FIG. 1, vehicle 100 may be additionally equipped with sensor 150, which may be sensors used in a navigation unit, such as a GPS receiver and one or more IMU sensors. A GPS is a global navigation satellite system that provides geolocation and time information to a GPS receiver. An IMU is an electronic device that measures and provides a vehicle's specific force, angular rate, and sometimes the magnetic field surrounding the vehicle, using various inertial sensors, such as accelerometers and gyroscopes, sometimes also magnetometers. By combining the GPS receiver and the IMU sensor, sensor 150 can provide real-time pose information of vehicle 100 as it travels, including the positions and orientations (e.g., Euler angles) of vehicle 100 at each time stamp.

In some embodiments, the point cloud data acquired by the LiDAR unit of sensor 140 may be initially in a local coordinate system of the LiDAR unit and may need to be transformed into a global coordinate system (e.g. the longitude/latitude coordinates) for later processing. Vehicle 100's real-time pose information collected by sensor 150 of the navigation unit may be used for transforming the point cloud data from the local coordinate system into the global coordinate system by point cloud data registration, for example, based on vehicle 100's poses at the time each point was acquired. In order to register the point cloud data with the matching real-time pose information, sensors 140 and 150 may be integrated as an integrated sensing system such that the cloud point data can be aligned by registration with the pose information when they are collected. The integrated sensing system may be calibrated with respect to a calibration target to reduce the integration errors, including but not limited to, mounting angle error and mounting vector error of sensors 140 and 150. Through integration calibration, one or more sensor calibration parameters can be optimized, such as mounting angles of the LiDAR unit and the navigation unit, offset of the center of the LiDAR and the GPS receiver antenna.

Figure 2:
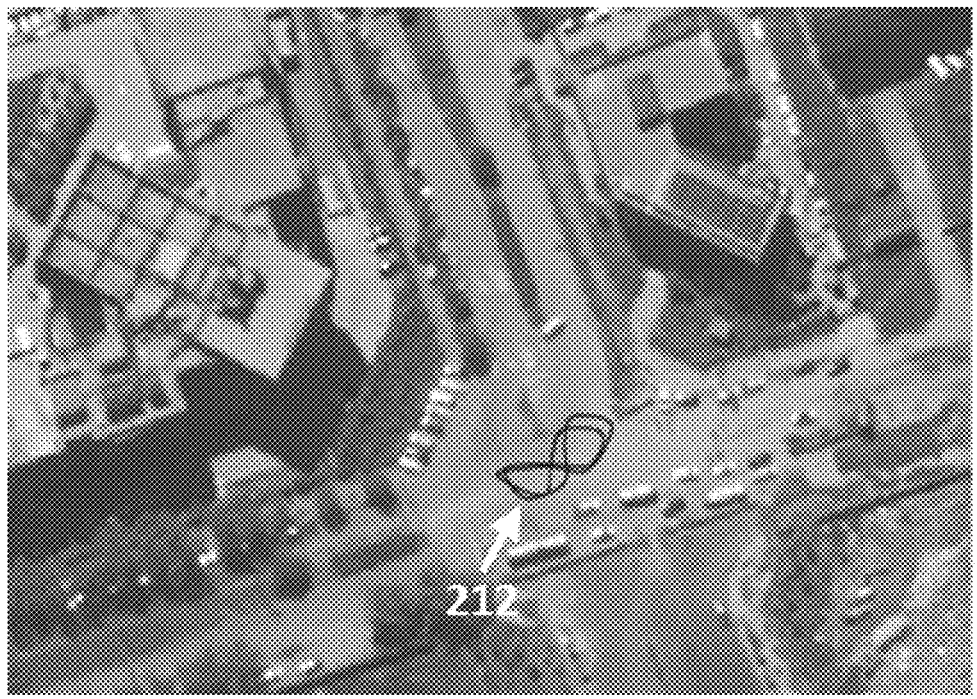
FIG. 2 illustrates exemplary calibration targets and vehicle trajectory in a natural scene for calibrating the sensors, according to embodiments of the disclosure.
Figure 2:

For example, FIG. 2 illustrates exemplary calibration targets and vehicle trajectory in a natural scene for calibrating sensors 140 and 150, according to embodiments of the disclosure. The calibration can be performed in a natural environment and may not rely on any dedicated artificial calibration target and thus, has various advantages over existing systems and methods, such as fully automation, high flexibility and efficiency, etc.

As illustrated in an aerial view image 210, a natural scene in which integrated sensors (e.g., sensors 140 and 150) equipped on a vehicle (e.g., vehicle 100) can be calibrated may include various surrounding objects, such as moving objects (e.g., other vehicles, pedestrians, animals, etc.) and static objects (e.g., buildings, plants, roads, street lights, traffic signs, traffic lights, etc.). A static object may be a planar object (e.g., walls or roads) or a non-planar object (e.g., a plant). In some embodiments, surrounding objects that are static planar objects, such as walls and roads, may be identified as the calibration targets. Data indicative of the calibration targets, such as point cloud data and pose information, may be captured by the integrated sensors of vehicle 100 as vehicle 100 travels along a trajectory. In some embodiments, surrounding objects that are moving objects (e.g., vehicles and pedestrians) or static non-planar objects (e.g., plants) may be avoided as calibration targets. The selection of the natural scene used for sensor calibration may be based on the existence or the numbers of suitable calibration targets (i.e., static planar objects) and unsuitable calibration targets (i.e., moving objects and static non-planar objects) in the scene. For example, a scene including a large number of moving objects (e.g., more than 5 moving objects) may not be used for sensor calibration. For example, aerial view image 210 illustrates a natural scene suitable for sensor calibration as it includes mainly buildings (with walls) and roads.

Consistent with present disclosure, vehicle 100 may travel along a trajectory when capturing the data indicative of the identified surrounding object (i.e., the calibration target). In some embodiments, in order to ensure accurate calculation of normal vectors (described below in detail), vehicle 100 may repeatedly travel along the same trajectory and alter the Euler angles of vehicle 100 as it travels. For example, the trajectory may be arbitrary, but include a change in yaw so that lateral and longitudinal offsets of the LiDAR unit can be detected. In aerial view image 210, vehicle 100 travels repeatedly along an 8-shaped trajectory 212 to collect data indicative of the building walls, such as a set of point cloud data, as well as vehicle 100's real-time pose information (e.g., the time, position, and orientation) as it collects the point cloud data. A landscape view image 220 illustrates the surrounding building walls identified as the calibration targets.

Figure 3:
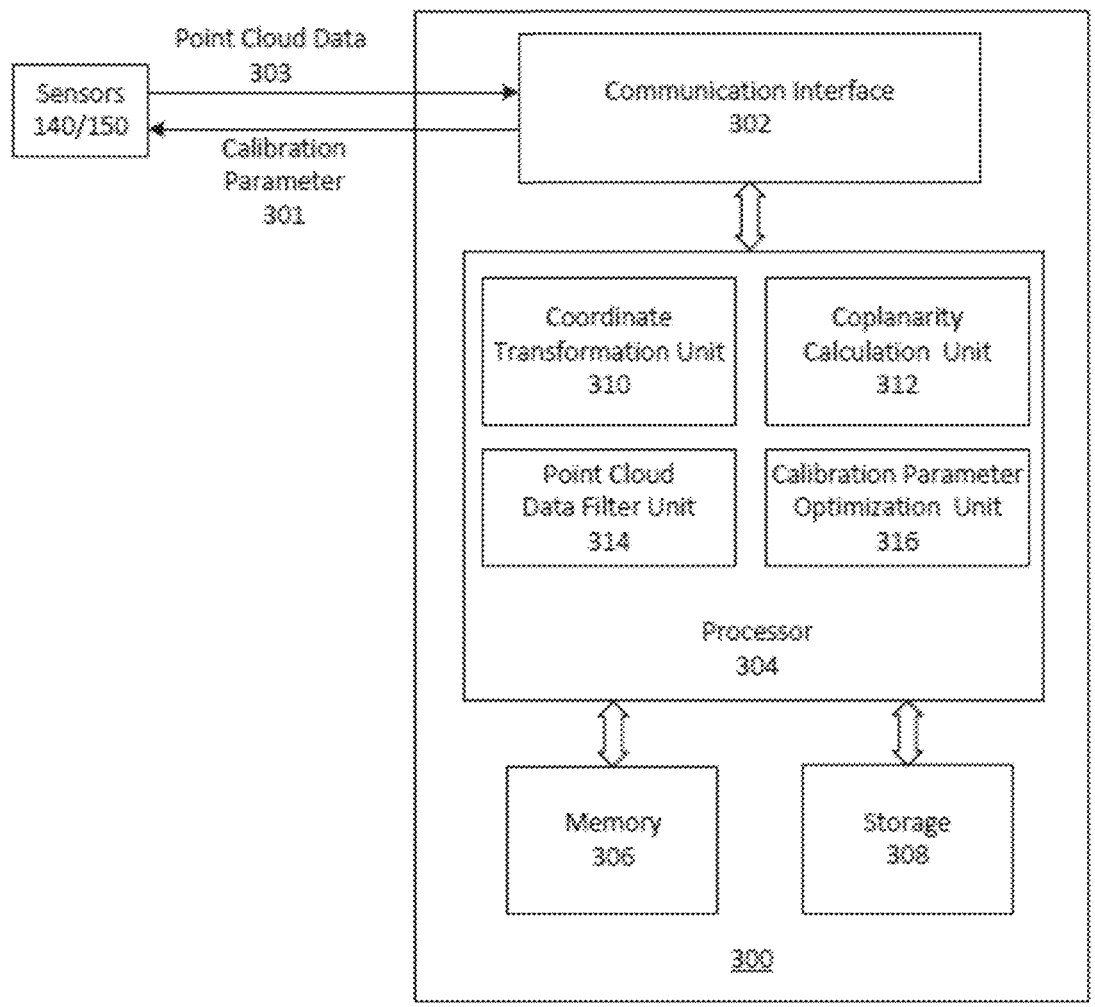
FIG. 3 illustrates a block diagram of an exemplary controller for calibrating the sensors, according to embodiments of the disclosure.

Referring back to FIG. 1, consistent with the present disclosure, vehicle 100 may include a local controller 160 in body 110 of vehicle 100 or communicate with a remote controller (not illustrated in FIG. 1) for calibrating integrated sensors 140 and 150 to optimize the sensor calibration parameters and thus, reduce integration errors and improve the accuracy of the acquired data. For example, FIG. 3 illustrates a block diagram of an exemplary controller 300 for calibrating sensors 140 and 150, according to embodiments of the disclosure. Consistent with the present disclosure, calibration parameters 301 of sensors 140 and 150 may be adjusted towards optimal values based on a set of point cloud data 303 captured by sensor 140.

In some embodiments, as shown in FIG. 3, controller 300 may include a communication interface 302, a processor 304, a memory 306, and a storage 308. In some embodiments, controller 300 may have different modules in a single device, such as an integrated circuit (IC) chip (implemented as an application-specific integrated circuit (ASIC) or a field-programmable gate array (FPGA), or separate devices with dedicated functions. In some embodiments, one or more components of controller 300 may be located inside vehicle 100 (e.g., local controller 160 FIG. 1) or may be alternatively in a mobile device, in the cloud, or another remote location. Components of controller 300 may be in an integrated device, or distributed at different locations but communicate with each other through a network (not shown). For example, processor 304 may be a processor on-board vehicle 100, a processor inside a mobile device, or a cloud processor, or any combinations thereof.

Communication interface 302 may send data to and receive data from components such as sensors 140 and 150 via communication cables, a Wireless Local Area Network (WLAN), a Wide Area Network (WAN), wireless networks such as radio waves, a nationwide cellular network, and/or a local wireless network (e.g., Bluetooth or WiFi), or other communication methods. In some embodiments, communication interface 302 can be an integrated services digital network (ISDN) card, cable modem, satellite modem, or a modem to provide a data communication connection. As another example, communication interface 302 can be a local area network (LAN) card to provide a data communication connection to a compatible LAN. Wireless links can also be implemented by communication interface 302. In such an implementation, communication interface 302 can send and receive electrical, electromagnetic or optical signals that carry digital data streams representing various types of information via a network.

Consistent with some embodiments, communication interface 302 may receive data captured by sensors 140 and 150, such as set of point cloud data 303 indicative of a calibration target and pose information of vehicle 100, and provide the received data to storage 308 for storage or to processor 304 for processing. Communication interface 302 may also receive calibration parameter 301 generated by processor 304, and provide calibration parameters 301 to sensors 140 and 150, which will be used for calibrating sensors 140 and 150 accordingly.

Processor 304 may include any appropriate type of general-purpose or special-purpose microprocessor, digital signal processor, or microcontroller. Processor 304 may be configured as a separate processor module dedicated to calibrating sensors equipped on vehicle 100 using non-artificial calibration targets in natural scenes. Alternatively, processor 304 may be configured as a shared processor module for performing other functions unrelated to calibrating sensors.

As shown in FIG. 3, processor 304 may include multiple modules, such as a coordinate transformation unit 310, a coplanarity calculation unit 312, a point cloud data filter unit 314, a calibration parameter optimization unit 316, and the like. These modules (and any corresponding sub-modules or sub-units) can be hardware units (e.g., portions of an integrated circuit) of processor 304 designed for use with other components or to execute a part of a program. The program may be stored on a computer-readable medium, and when executed by processor 304, it may perform one or more functions. Although FIG. 3 shows units 310-316 all within one processor 304, it is contemplated that these units may be distributed among multiple processors located near or remotely with each other.

Coordinate transformation unit 310 may be configured to transform a set of point cloud data 303 captured by sensor 140 in a local coordinate system (e.g., the coordinate system used by the LiDAR unit) into a global coordinate system based on the real-time pose information of vehicle 100 acquired by sensor 150. Point cloud data 303 may contain a set of data points on the external surfaces of objects (e.g., the identified calibration target) around it. The pose information may include positions and orientations of vehicle 100 at each time stamp. In some embodiments, point cloud data 303 may be recorded as vehicle 100 transitions through a series of poses (e.g., positions and orientations) in a time period. Coordinate transformation unit 310 may project each point in the point cloud represented by point cloud data 303 into the global coordinate system (e.g., the longitude/latitude coordinates) based on vehicle 100's poses at the time each point was acquired. Since point cloud data 303 and the pose information are collected by integrated sensors 140 and 150, initial calibration parameters of sensors 140 and 150 (e.g., the coordinate axes and centers) may be also used as coordinate transformation. Prior to optimizing the calibration parameters, the initial calibration parameters may be set as values measured roughly by instrument, such as a tape. After being projected into the global coordinate system, each data point in point cloud data 303 may be represented by a set of coordinates in the global coordinate system and additional information, such as the laser intensity at the point or any information derived from the pose information.

Coplanarity calculation unit 312 may be configured to determine coplanarity associated with point cloud data 303 in the global coordinate system. As referred to herein, coplanarity is the state or degree of two or more points being within the same plane. Since points in space tend to lie on contiguous surfaces, proximity points may be considered as coplanar points (i.e., with coplanarity above a threshold). Coplanar data (e.g., point cloud data of a static planar object) is helpful to accurate sensor calibration, while non-coplanar data (e.g., point cloud data of a moving object or a static non-planar object) may affect the accuracy of sensor calibration. Thus, coplanarity calculation unit 312 may identify coplanarity of data points from point cloud data 303 by using point cloud data filter unit 314 to filter out non-coplanar data.

In some embodiments, coplanarity may be determined by coplanarity calculation unit 312 based on a difference of (i.e., $\Delta$) normal vectors in a plurality of scales associated with point cloud data 303. A normal vector (also known as "normal") to a surface is a vector perpendicular to the tangent plane to that surface at a given point. When calibrating integrated sensors in natural scenes, sometimes moving objects or static non-planar objects cannot be avoided. Consistent with the present disclosure, the difference of normal vectors in varying scales may be used to distinguish static planar objects from moving objects and static non-planar objects. For example, the difference of normal vectors in varying scales of static planar objects is smaller than that of moving objects or static non-planar objects.

Figure 4:
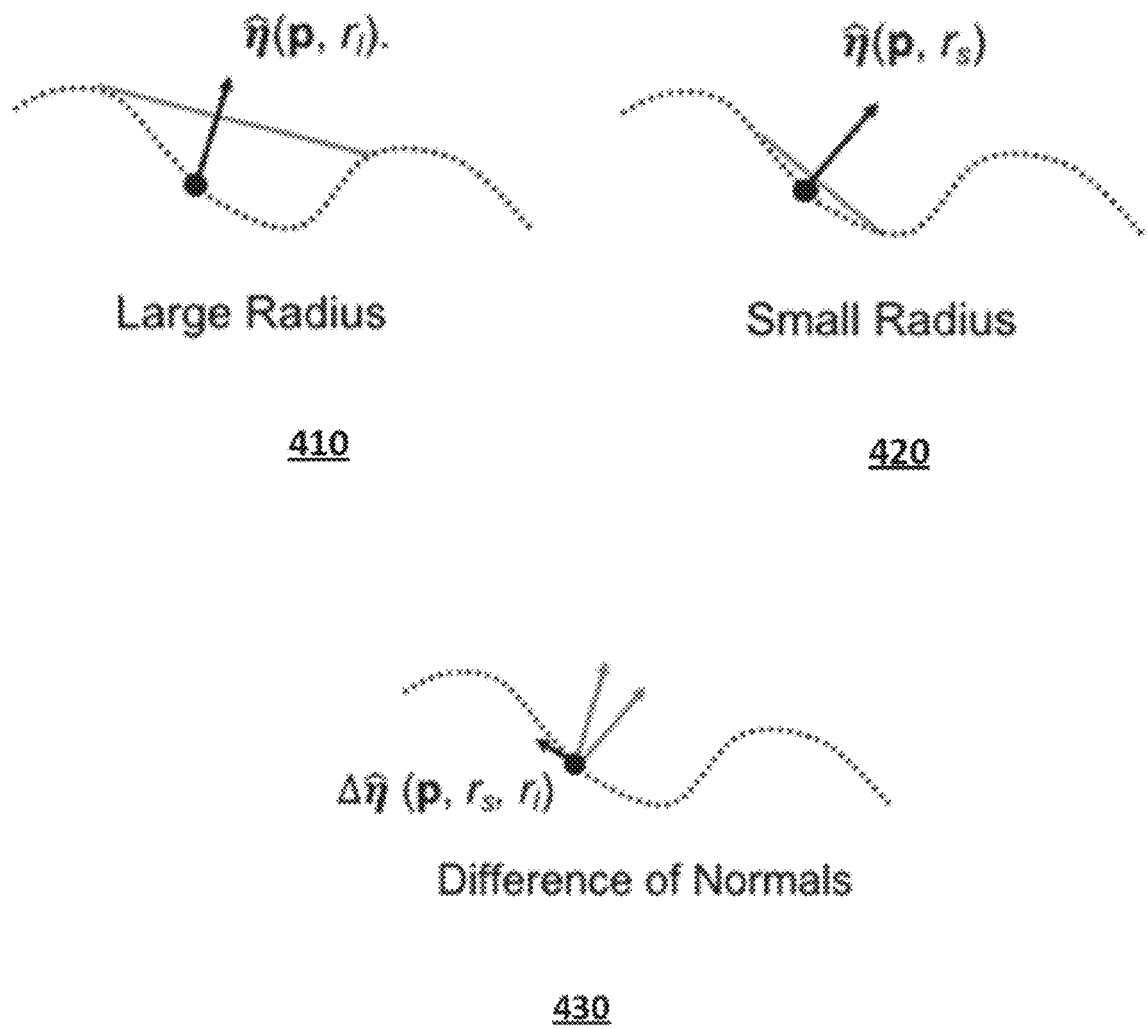
FIG. 4 illustrates an exemplary method of calculating a normal vector difference in varying scales, according to embodiments of the disclosure.

FIG. 4 illustrates an exemplary method of calculating a normal vector difference in varying scales, according to embodiments of the disclosure. As shown in FIG. 4, P represents a set of point cloud data $\{p1, p2, \ldots, p_N\}$, each of which is depicted as a dot. The point cloud may be indicative of surfaces of a calibration object. The set of point cloud data P may be associated with a multi-scale space, including a first scale defined by two far-end points (large radius $r_l$) as shown in 410 and a second scale defined by two near-end points (small radius $r_s$) that is smaller than the first scale as shown in 420. The normal vectors associated with the same point p in the point cloud (represented as a large dot) in the first and second scales are calculated in 410 and 420, respectively. In 410, a first normal vector $\hat{\eta}$ to the tangent plane $T(p, r_l)$ at point p in the first scale $r_l$ is calculated as $\hat{\eta}(p, r_l)$. In 420, a second normal vector $\hat{\eta}$ to the tangent plane $T(p, r_s)$ at point p in the second scale $r_s$ is calculated as $\hat{\eta}(p, r_s)$. In 430, the difference of the first and second normal vectors $\Delta\hat{\eta}$ at point p in the first and second scales $r_l, r_s$ is calculated as $\Delta\hat{\eta}(p, r_s, r_l)$.

Referring back to FIG. 3, point cloud data filter unit 314 may be configured to filter point cloud data 303 based on the coplanarity associated with set of point cloud data 303. As described above, coplanarity, such as the difference of normal vectors in varying scales associated with a point in the point cloud, may be used as the basis to identify non-coplanar data (e.g., representing points on a moving or static non-planar object) and filter out the non-coplanar data from point cloud data 303 to improve the data quality for calibration. In some embodiments, a threshold may be used to determine whether a point is a non-coplanar point by comparing the corresponding normal vectors difference at the point with the threshold. That is, the points with relatively large normal vector differences (e.g., with respect to the threshold) may be identified as non-coplanar points, and their data in point cloud data 303 may be filtered out as non-coplanar noise data by point cloud data filter unit 314.

Figure 5:
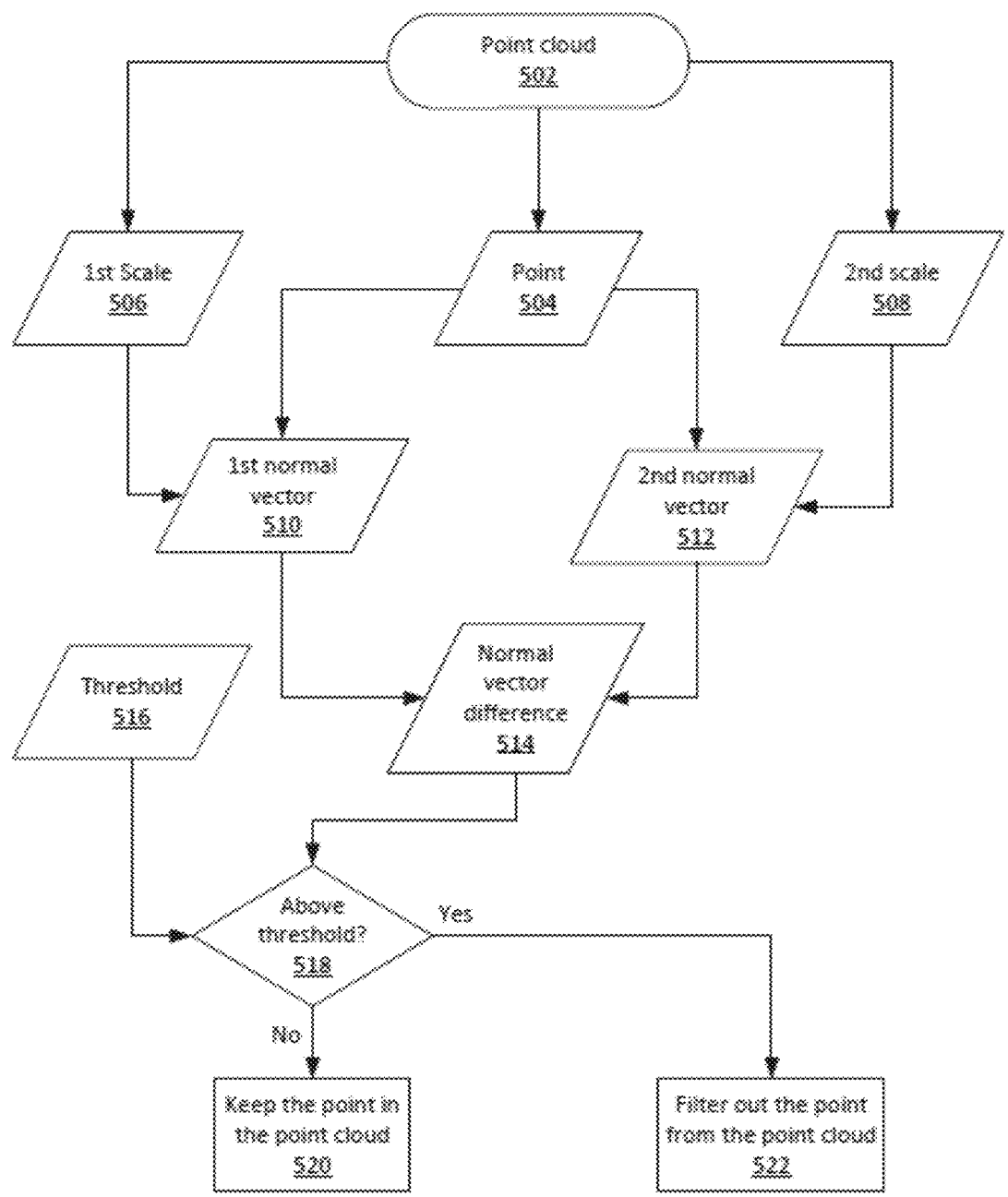
FIG. 5 illustrates a data flowchart of an exemplary method for filtering point cloud data, according to embodiments of the disclosure.

FIG. 5 illustrates a data flowchart of an exemplary method 500 for filtering point cloud data, according to embodiments of the disclosure. Consistent with some embodiments, in a point cloud 502, each point 504 may pass through point cloud data filter unit 314 based on its normal vector difference in a first scale 506 and a second scale 508 associated with point cloud 502. Each of first and second scales 506 and 508 may be defined by points in point cloud 502. A first normal vector 510 associated with point 504 in first scale 506 may be calculated. A second normal vector 512 associated with point 504 in second scale 508 may be calculated as well. A normal vector difference 514 of first and second normal vectors 510 and 512 may be calculated and compared with a threshold 516. For example, threshold 516 may be any suitable value predetermined based on prior experience. At 518, whether normal vector difference 514 is above threshold 516 is determined. If normal vector difference 514 is not above threshold 516 (i.e., relatively small difference of normal vectors in first and second scales 506 and 508), then at 520, point 504 may be considered as a coplanar point and thus, kept in point cloud 502. Otherwise, if normal vector difference 514 is above threshold 516 (i.e., relatively large difference of normal vectors in first and second scales 506 and 508), then at 522, point 504 may be considered as a non-coplanar point and thus, filtered out from point cloud 502. As a result, the filtered point cloud 502 will not include point 504.

Referring back to FIG. 3, calibration parameter optimization unit 316 may be configured to adjust calibration parameter 301 of sensors 140 and 150 based on a model using the filtered set of point cloud data 303 as an input of the model, such that an output of the model is decreased. The model may include a weight based on the coplanarity associated with set of point cloud data 303. In some embodiments, the weight may be a reciprocal of the difference of the normal vectors in varying scales at a point in the point cloud. By iteratively adjusting calibration parameter 301 until the output of the model is minimized, calibration parameter 301 may be optimized to achieve an optimal value used for calibrating sensors 140 and 150. An exemplary algorithm and model that can be implemented by calibration parameter optimization unit 316 are described below in detail. It is contemplated that any other suitable algorithms and/or models may be implemented as well by calibration parameter optimization unit 316 to adjust calibration parameter 301 using filtered point cloud data 303.

The exemplary algorithm includes: (a) selecting a laser scan beam $b_j$ and its point set $P(b_j)$ from filtered set of point cloud data 303, which has been transformed into the global coordinate system using initial calibration parameters based on the pose information of vehicle 100; (b) for laser scan beam $b_j$, selecting a neighboring laser scan beam $n_j$ and its point set $P(n_j)$ from filtered point cloud data 303; (c) selecting a point $p_k$ from point set $P(n_j)$; (d) selecting a point $m_k$ from point set $P(b_j)$ that has the minimum distance from point $p_k$, and calculating the normal vector $\eta_k$ at point $m_k$; and (f) calculating the distance between the point $p_k$ and the surface of point $m_k$. As points $p_k$ and $m_k$ are selected from filtered point cloud data 303 and close enough, they are on the same surface of static planar objects, but not moving objects or static non-planar objects. For example, each of the normal vector differences at points $p_k$ and $m_k$ is smaller than the threshold. Thus, the corresponding data of points $p_k$ and $m_k$ may be coplanar data. Processes (a)-(f) above may be repeatedly performed by calibration parameter optimization unit 316 until all the laser scan beams of sensor 140 have been traversed.

The exemplary algorithm then uses the total distances calculated for all the points in the point cloud as a cost function for the optimization:

$$J(x) = \sum_{b_i=1}^{B} \sum_{\substack{n_j=b_i-N \\ n_j \neq b_i}}^{b_i+N} \sum_{k=1}^{K} \omega_k \|\eta_k \cdot (p_k - m_k)\|^2, \ p_k, m_k \in \{\text{plane data}\} \quad [1]$$

$$\omega_k = \frac{1}{\Delta \eta}, \quad [2]$$

where i represents the numbering of each laser scan beam, $b_i \in \{1, 2, \ldots, B\}$ in which B represents the total number of laser scan beams; j represents the neighboring laser scan beam of i, $n_j \in \{b_i-N, \ldots, b_i+N\}$, $n_j \neq b_i$ in which N represents the number of neighboring laser scan beams; $\eta_k$ represents the normal vector. $\omega_k$ is a weight of the model as shown in Equation [1], which represents the confidence level of the point cloud coplanarity, such as the reciprocal of the normal vector difference $\Delta \eta$ (described above in detail) as shown in Equation [2]. That is, the weight of the model may be based on the coplanarity of each point. For example, the point with high coplanarity (e.g., represented as small normal vector difference in multiple scales) may be assigned with a large weight, while the point with low coplanarity (e.g., represented as a large normal vector difference in multiple scales) may be assigned with a small weight. Accordingly, the coplanarity associated with set of point cloud data 303 may be not only used for filtering point cloud data 303 by point cloud data filter unit 314, but also used for determining the weights of each point in the model for optimizing calibration parameter 301 by calibration parameter optimization unit 316.

By adjusting calibration parameter 301 of sensors 140 and 150, the value of cost function J(x) may be changed. Calibration parameter optimization unit 316 may be configured to adjust calibration parameter 301 such that the value of J(x) is decreased. In some embodiments, calibration parameter optimization unit 316 may adjust J(x) iteratively until its value is minimized. The corresponding value of calibration parameter 301 becomes the optimal value used for calibrating sensors 140 and 150.

Figure 6:
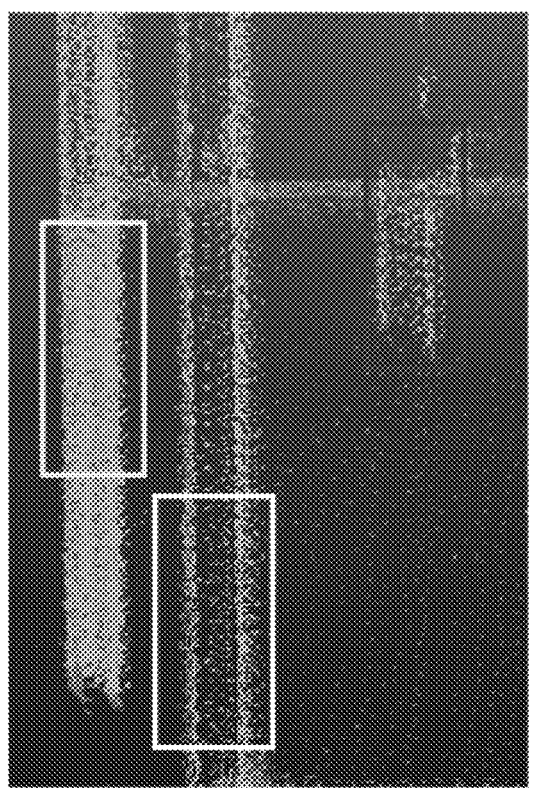
FIG. 6 illustrates exemplary point clouds of the same object before and after sensor calibration, according to embodiments of the disclosure.
Figure 6:
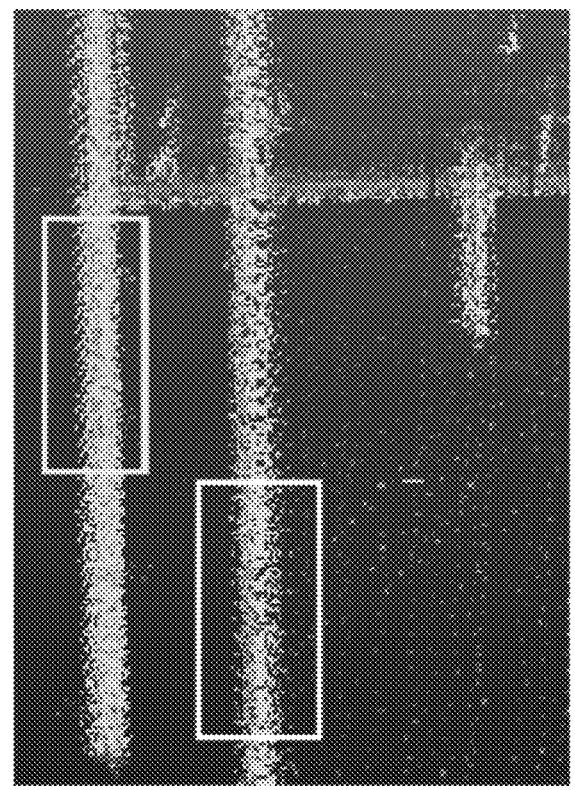

For example, FIG. 6 illustrates exemplary point clouds 610 and 620 of the same object (building walls) before and after sensor calibration, respectively, according to embodiments of the disclosure. Point cloud 610 of the building walls are generated by data collected by sensors 140 and 150 before sensor calibration (e.g., using arbitrary initial calibration parameters). In contrast, point cloud 620 of the same building walls are re-generated by data collected by sensors 140 and 150 after sensor calibration (e.g., using the optimal calibration parameters). For example, the thickness of the building walls represented in point cloud 620 (annotated in rectangles) is thinner than the thickness of the same building walls represented in point cloud 610 (annotated in rectangles) since the integration errors of sensors 140 and 150 are reduced by the optimal calibration parameters.

Referring back to FIG. 3, memory 306 and storage 308 may include any appropriate type of mass storage provided to store any type of information that processor 304 may need to operate. Memory 306 and storage 308 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 306 and/or storage 308 may be configured to store one or more computer programs that may be executed by processor 304 to perform sensor calibration functions disclosed in this application. For example, memory 306 and/or storage 308 may be configured to store program(s) that may be executed by processor 304 to control sensor 140 to capture calibration target data and control sensor 150 to acquire vehicle pose information when vehicle 100 travels along a trajectory, and process the captured data to adjust the calibration parameters of sensors 140 and 150.

Memory 306 and/or storage 308 may be further configured to store information and data used by processor 304. For instance, memory 306 and/or storage 308 may be configured to store the point cloud data captured by sensor 140 and the real-time pose information obtained by sensor 150, the model used for optimizing the calibration parameters, and the initial, intermediate, and optimal values of the calibration parameters. These data, information, and model may be stored permanently, removed periodically, or disregarded immediately after each frame of data is processed.

Figure 7:
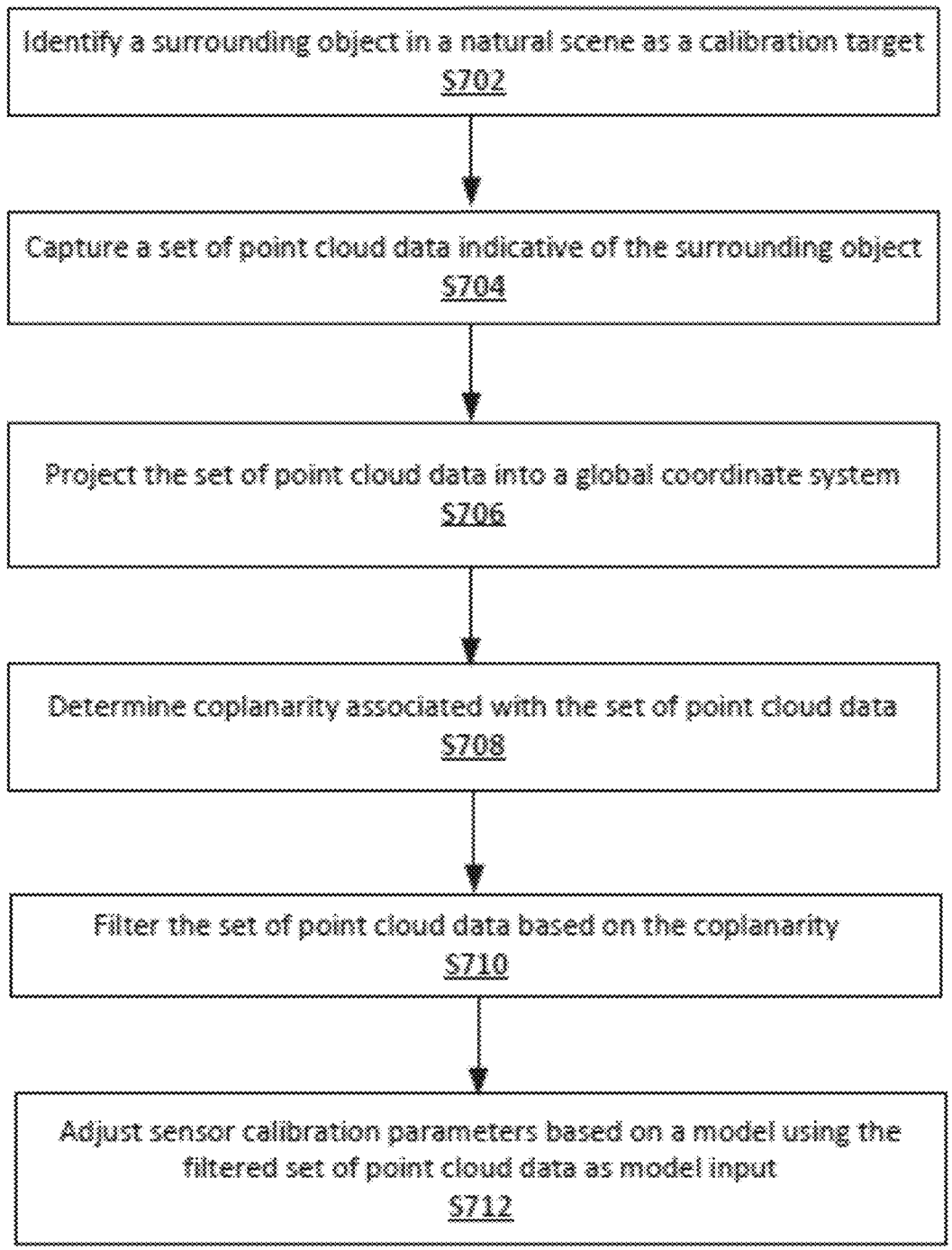
FIG. 7 illustrates a flowchart of an exemplary method for calibrating a plurality of sensors, according to embodiments of the disclosure.

FIG. 7 illustrates a flowchart of an exemplary method 700 for calibrating a plurality of sensors, according to embodiments of the disclosure. For example, method 700 may be implemented by an integrated sensor calibration system of vehicle 100 that includes, among other things, controller 300 and sensors 140 and 150. Method 700 may include steps S702-S712 as described below.

In step S702, an object surrounding vehicle 100 in a natural scene may be identified as a calibration target. Vehicle 100 may be a survey vehicle travels repeatedly along a trajectory in a natural scene for calibrating sensors 140 and 150 equipped on vehicle 100. The calibration target may include a static planar object in the scene, such as a building wall or a road. The data collected with respect to static planar object is ideal for calibration. Accordingly, moving objects and non-planar objects, such as another vehicle or a plant in the scene may be removed to improve calibration accuracy. As a result, a dedicated calibration facility and/or artificial calibration targets are not necessary for sensor calibration, thereby increasing the calibration efficiency and flexibility.

In step S704, sensor 140 may capture a set of point cloud data indicative of the surrounding object (i.e., the identified calibration target), as vehicle 100 travels along a trajectory in the natural scene for sensor calibration. Vehicle 100 may be equipped with sensor 140, such as a LiDAR laser scanner. As vehicle 100 travels along the trajectory, sensor 140 may continuously capture frames of scene data at different time points in the form of a set of point cloud data in a local coordinate system. Vehicle 100 may be also equipped with sensor 150, such as a GPS receiver and one or more IMU sensors. Sensors 140 and 150 may form an integrated sensing system. In some embodiments, when vehicle 100 travels along the trajectory in the natural scene and when sensor 140 captures the set of point cloud data indicative of the calibration target, sensor 150 may acquire real-time pose information of vehicle 100.

In step S706, processor 304 may project the set of point cloud data in the local coordinate system into a global coordinate system based on the pose-information of vehicle 100. In some embodiments, any suitable values may be used for the initial calibration parameters for correlating the point cloud data and the pose-information for data registration in the global coordinate system, such as the longitude/latitude coordinates. For example, processor 304 may project the points in the point cloud into the global coordinate system based on vehicle 100's poses at the time each point was acquired.

In step S708, processor 304 may determine coplanarity associated with the set of point cloud data in the global coordinate system. In some embodiments, the coplanarity may be determined based on a difference of normal vectors in a plurality of scales associated with the set of point cloud data. For example, for each point in the point cloud, processor 304 may calculate a first normal vector associated with the point in a first scale and a second normal vector associated with the point in a second scale different from the first scale, and then calculate the difference of the first and second normal vectors. The normal vector difference may be an indication of the coplanarity associated with the set of point cloud data. The higher the normal vector difference is, the more likely the corresponding point may be a non-coplanar point (i.e., a point that is on the surfaces of a moving object or a static non-planar object).

In step S710, processor 304 may filter the set of point cloud data based on the coplanarity. In some embodiments, a threshold may be used to determine whether a point (and its corresponding data) should be removed from the point cloud (and the set of point cloud data). For example, the normal vector difference associated with a point may be compared with the threshold. If the normal vector difference is not above the threshold, the point data will remain in the set of point cloud data because the point is deemed as a coplanar point on a surface of a static planar object. Otherwise, the point data will be filtered out from the set of point cloud data because the point is deemed as a non-coplanar point on a surface of a moving object or a static non-planar object.

In step S712, processor 304 may adjust the calibration parameters of sensors 140 and 150 based on an optimization model using the filtered set of point cloud data as the input of the model, such that the cost function value of the model is decreased. The model may include a weight based on the coplanarity associated with the set of point cloud data. In some embodiments, the weight may be a reciprocal of the difference of the normal vectors associated with each point in the filtered set of point cloud data. Processor 304 may continuously adjust the calibration parameters until the cost function value of the model is minimized. The corresponding calibration parameters then have the optimal values for the calibration of sensors 140 and 150.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A method for calibrating a plurality of sensors, comprising:
    capturing, by a plurality of sensors associated with a vehicle, a set of point cloud data indicative of at least one surrounding object as the vehicle travels along a trajectory;
    filtering, by a processor, the set of point cloud data based on coplanarity associated with the set of point cloud data to remove point cloud data representing at least one of a moving object or a non-planar object; and
    adjusting, by the processor, at least one calibration parameter of the plurality of sensors based on a model using the filtered set of point cloud data, wherein the model includes a weight corresponding to the coplanarity associated with the set of point cloud data.

2. The method of claim 1, further comprising determining the coplanarity based on a difference of normal vectors in a plurality of scales associated with the set of point cloud data.

3. The method of claim 2, wherein the weight is a reciprocal of the difference of the normal vectors.

4. The method of claim 1, wherein the at least one surrounding object includes a static planar object in a natural scene.

5. The method of claim 1, wherein the vehicle repeatedly travels along the trajectory and alters direction of the vehicle when the set of point cloud data being captured.

6. The method of claim 1, wherein the plurality of sensors include a light detection and ranging (LiDAR) laser scanner, a global positioning system (GPS) receiver, and an inertial measurement unit (IMU) sensor.

7. The method of claim 2, wherein filtering the set of point cloud data based on the coplanarity associated with the set of point cloud data comprises:
    calculating a first normal vector associated with a point in the point cloud in a first scale;
    calculating a second normal vector associated with the point in a second scale;
    calculating a difference of the first normal vector and the second normal vector; and
    removing the point from the point cloud based on the difference being greater than a threshold.

8. A system for calibrating a plurality of sensors, comprising:
    a plurality of sensors associated with a vehicle and configured to capture a set of point cloud data indicative of at least one surrounding object, as the vehicle travels along a trajectory; and
    a processor configured to:
        filter the set of point cloud data based on coplanarity associated with the set of point cloud data to remove point cloud data representing at least one of a moving object or a non-planar object; and
        adjust at least one calibration parameter of the plurality of sensors based on a model using the filtered set of point cloud data, wherein the model includes a weight corresponding to the coplanarity associated with the set of point cloud data.

9. The system of claim 8, wherein the processor is further configured to determine the coplanarity based on a difference of normal vectors in a plurality of scales associated with the set of point cloud data.

10. The system of claim 9, wherein to filter the set of point cloud data based on the coplanarity associated with the set of point cloud data, the processor is further configured to:
- calculate a first normal vector associated with a point in the point cloud in a first scale;
- calculate a second normal vector associated with the point in a second scale;
- calculate a difference of the first normal vector and the second normal vector; and
- remove the point from the point cloud based on the difference being greater than a threshold.

11. The system of claim 9, wherein the weight is a reciprocal of the difference of the normal vectors.

12. The system of claim 8, wherein the at least one surrounding object includes a static planar object in a natural scene.

13. The system of claim 8, wherein the vehicle repeatedly travels along the trajectory and alters direction of the vehicle when the set of point cloud data being captured.

14. The system of claim 8, wherein the plurality of sensors include a LiDAR laser scanner, a GPS receiver, and an IMU sensor.

15. A non-transitory computer-readable medium having instructions stored thereon that, when executed by one or more processors, causes the one or more processors to perform operations comprising:
- receiving a set of point cloud data indicative of at least one surrounding object captured by a plurality of sensors associated with a vehicle, as the vehicle travels along a trajectory;
- filtering the set of point cloud data based on coplanarity associated with the set of point cloud data to remove point cloud data representing at least one of a moving object or a non-planar object; and
- adjusting at least one calibration parameter of the plurality of sensors based on a model using the filtered set of point cloud data, wherein the model includes a weight corresponding to the coplanarity associated with the set of point cloud data.

16. The non-transitory computer-readable medium of claim 15, wherein the operations further comprise determining the coplanarity based on a difference of normal vectors in a plurality of scales associated with the set of point cloud data.

17. The non-transitory computer-readable medium of claim 16, wherein the weight is a reciprocal of the difference of the normal vectors.

18. The non-transitory computer-readable medium of claim 15, wherein the at least one surrounding object includes a static planar object in a natural scene.

19. The non-transitory computer-readable medium of claim 15, wherein the vehicle repeatedly travels along the trajectory and alters Euler angels of the vehicle when the set of point cloud data being captured.

20. The non-transitory computer-readable medium of claim 16, wherein filtering the set of point cloud data based on the coplanarity associated with the set of point cloud data comprises:
- calculating a first normal vector associated with a point in the point cloud in a first scale;
- calculating a second normal vector associated with the point in a second scale;
- calculating a difference of the first normal vector and the second normal vector; and
- removing the point from the point cloud based on the difference being greater than a threshold.

* * * * *